(12) United States Patent
Boynes

(10) Patent No.: US 9,110,680 B1
(45) Date of Patent: Aug. 18, 2015

(54) AVOIDING OR DEFERRING DATA COPIES

(71) Applicant: Amazon Technologies, Inc., Reno, NV (US)

(72) Inventor: Jeremy Boynes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 126 days.

(21) Appl. No.: 13/804,047

(22) Filed: Mar. 14, 2013

(51) Int. Cl.
*G06F 9/44* (2006.01)
*G06F 9/45* (2006.01)
*G06F 11/36* (2006.01)
*G06F 17/30* (2006.01)
*G06F 12/00* (2006.01)

(52) U.S. Cl.
CPC ............. *G06F 8/443* (2013.01); *G06F 11/36* (2013.01); *G06F 17/30* (2013.01); *G06F 12/00* (2013.01)

(58) Field of Classification Search
CPC ......... G06F 12/10; G06F 17/30; G06F 11/36; G06F 8/443
See application file for complete search history.

(56) References Cited

U.S. PATENT DOCUMENTS

| | | | |
|---|---|---|---|
| 5,812,850 A * | 9/1998 | Wimble | 717/131 |
| 6,438,560 B1 | 8/2002 | Loen | |
| 7,076,773 B2 | 7/2006 | Schmidt | |
| 7,376,808 B2 * | 5/2008 | Cascaval et al. | 711/207 |
| 7,707,178 B2 * | 4/2010 | Prahlad et al. | 707/617 |
| 7,788,653 B2 | 8/2010 | Shi et al. | |
| 7,839,410 B1 * | 11/2010 | Brown et al. | 345/541 |
| 8,065,665 B1 * | 11/2011 | Kosche et al. | 717/127 |
| 8,140,786 B2 * | 3/2012 | Bunte et al. | 711/161 |
| 8,141,064 B2 | 3/2012 | Chipman | |
| 8,281,293 B2 | 10/2012 | Fulton et al. | |
| 2002/0087563 A1 * | 7/2002 | Ghemawat et al. | 707/100 |
| 2005/0262493 A1 * | 11/2005 | Schmidt et al. | 717/164 |
| 2007/0067770 A1 * | 3/2007 | Thomasson | 718/100 |
| 2008/0092128 A1 * | 4/2008 | Corry et al. | 717/158 |
| 2008/0209439 A1 * | 8/2008 | Lankreijer | 719/314 |
| 2009/0031292 A1 * | 1/2009 | Fulton et al. | 717/151 |
| 2009/0083314 A1 * | 3/2009 | Maim | 707/103 R |
| 2009/0249015 A1 * | 10/2009 | Tzeng | 711/165 |

(Continued)

OTHER PUBLICATIONS

Vivek S. Pai et al. "IO-Lite: A Unified I/O Buffering and Caching System", [Online], 2000. pp. 37-66, [Retrieved from Internet on Apr. 3, 2015], <http://delivery.acm.org/10.1145/340000/332895/p37-pai.pdf>.*

(Continued)

*Primary Examiner* — Thuy Dao
*Assistant Examiner* — Ziaul A Chowdhury
(74) *Attorney, Agent, or Firm* — Robert C. Kowert; Meyertons, Hood, Kivlin, Kowert & Goetzel, P.C.

(57) ABSTRACT

Methods and systems for avoiding or deferring data copies are disclosed. Using a virtual machine, it is determined whether a set of program code comprises references to a data object after an operation to generate a copy of the data object. If not, a set of optimized program code is generated in which the operation to copy the data object is replaced with an operation to update a reference. Using the virtual machine, it is determined whether the set of program code comprises an operation to generate a copy of a buffer object. If so, a set of further optimized program code is generated, comprising an allocation of one or more memory pages to store the buffer object with a copy-on-write parameter instead of the operation to generate the copy of the buffer object.

14 Claims, 8 Drawing Sheets

(56) References Cited

U.S. PATENT DOCUMENTS

| | | | |
|---|---|---|---|
| 2009/0319739 A1* | 12/2009 | Shpeisman et al. | 711/163 |
| 2012/0059796 A1* | 3/2012 | Neumann et al. | 707/638 |
| 2013/0073830 A1* | 3/2013 | Gandhi | 711/170 |
| 2013/0219379 A1* | 8/2013 | Brauneis et al. | 717/158 |
| 2013/0268921 A1* | 10/2013 | Brauneis et al. | 717/158 |

OTHER PUBLICATIONS

Denis Caromel et al., "SharedOnRead Optimization in Parallel Object-Oriented Programming", [Online], 1999, pp. 182-193, [Retrieved form Internet on Apr. 3, 2015], <http://download-v2.springer.com/static/pdf/481/chp%253A10.1007%252F10704054_19.pdf>.*

Moti N. Thadani et al., "An Efficient Zero-Copy I/O Framework for UNIX®", [Online], 1995, pp. 1-19, [Retrieved from Internet on Apr. 3, 2015], <http://citeseerx.ist.psu.edu/viewdoc/download?doi=10.1.1.134.4874&rep=rep1&type=pdf>.*

Liuba Shrira, "SNAP: Efficient Snapshots for Back-in-Time Execution", [Online], 2005, pp. 1-12, [Retrieved from Internet on Apr. 3, 2015], <http://www.cs.brandeis.edu/~liuba/pubs/snap-icde05.pdf>.*

John Whaley and Martin Rinard, "Compositional Pointer and Escape Analysis for Java Programs," Proceedings of the 14th ACM SIGPLAN conference on Object-oriented programming, systems, languages, and applications, pp. 187-206, Oct. 1999.

Bruno Blanchet, "Escape Analysis for Java: Theory and Practice," ACM Transactions on Programming Languages and Systems, vol. 25, No. 6, pp. 713-775, Nov. 2003.

* cited by examiner

AVOIDING OR DEFERRING DATA COPIES

BACKGROUND

Using functionality such as an interpreter or just-in-time compiler, a virtual machine may provide a platform for execution of high-level programming language on suitable computing hardware. The virtual machine may take high-level program code written in the high-level programming language and generate executable program code for the underlying computing hardware. The program code that runs on the virtual machine may be substantially platform-independent, such that different implementations of the virtual machine may interpret or just-in-time compile the same set of high-level program code for execution on a plurality of types of computing hardware running any of a plurality of underlying operating systems.

As part of the process of generating executable code for the underlying hardware, the virtual machine may re-write program code to introduce various optimizations. For example, a just-in-time compiler that compiles bytecode to native code may make a trade-off between the time to compile the code and the eventual execution time of the compiled code. Generally speaking, the more optimization that is performed by the just-in-time compiler, the higher the quality of the compiled code, and the longer to produce the compiled code.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for avoiding or deferring data copies are described. Using the systems and methods described herein, program code that is executable using a virtual machine may be optimized to eliminate unnecessary copies of data objects under particular circumstances. In one embodiment, the program code may be optimized to replace a copy of a data object (e.g., an immutable object) with a pointer to the data object if there are no references to the original object outside of a particular code segment or after the copy operation in the original code. In this manner, an unnecessary copy of an object may be eliminated if the state of the object is never visible outside of a particular code segment (e.g., a builder function that produces the object as output). In one embodiment, an operation to copy a data object (e.g., a buffer or other data structure that accumulates data) may be removed, and the memory for storing the object may be allocated using a copy-on-write flag. In this manner, any copying of the object may be deferred until such time as a consumer of the object seeks to modify it.

Escape Analysis for Immutable Objects

Figure 1:
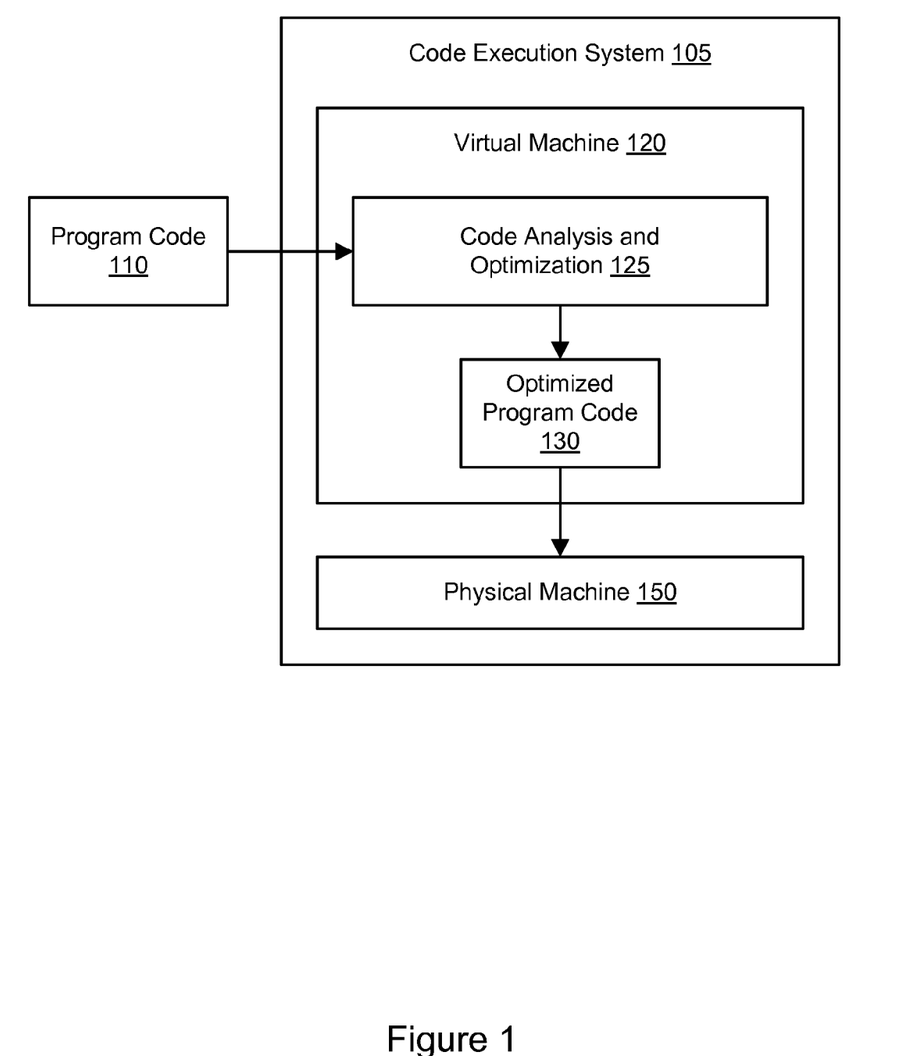
FIG. 1 illustrates an example system environment for avoiding data copies through program code analysis, according to one embodiment.

FIG. 1 illustrates an example system environment for avoiding data copies through program code analysis, according to one embodiment. In one embodiment, a code execution system 105 may include a virtual machine 120 and a physical machine 150. Using functionality such as an interpreter or just-in-time compiler, the virtual machine may provide a platform for execution of high-level programming language on suitable computing hardware such as the physical machine 150. The virtual machine 120 may take high-level program code written in the high-level programming language and generate executable program code for the underlying physical machine 150. The virtual machine 120 may be implemented using any suitable virtualization technologies. In one embodiment, the program code that runs on the virtual machine 120 may be substantially platform-independent, such that different implementations of the virtual machine 120 may interpret or just-in-time compile the same set of high-level program code for execution on a plurality of types of computing hardware running any of a plurality of underlying operating systems. The virtual machine 120 may also be referred to as a managed runtime system. The virtual machine 120 may be said to run on the physical machine 150. Any example of a suitable physical machine 150 is illustrated in FIG. 8.

In various embodiments, the virtual machine 120 may include various modules, such as a code analysis and optimization module 125. Using the code analysis and optimization module 125, optimized program code 130 may be generated based on program code 110 (e.g., bytecode). For example, the optimized program code 130 may eliminate or avoid unnecessary copies of data objects found in the program code 110. In one embodiment, the code analysis and optimization module 125 may work in tandem with an interpreter or just-in-time compiler of the virtual machine 120 to analyze and optimize code dynamically, i.e., as the program code 110 is being run. In one embodiment, the code analysis and optimization module 125 may work in a static manner to generate the optimized program code 130 prior to execution of any of the program code 130. The functionality of the code analysis and optimization module 125 is described in greater detail below with respect to FIGS. 2 and 3.

Figure 8:
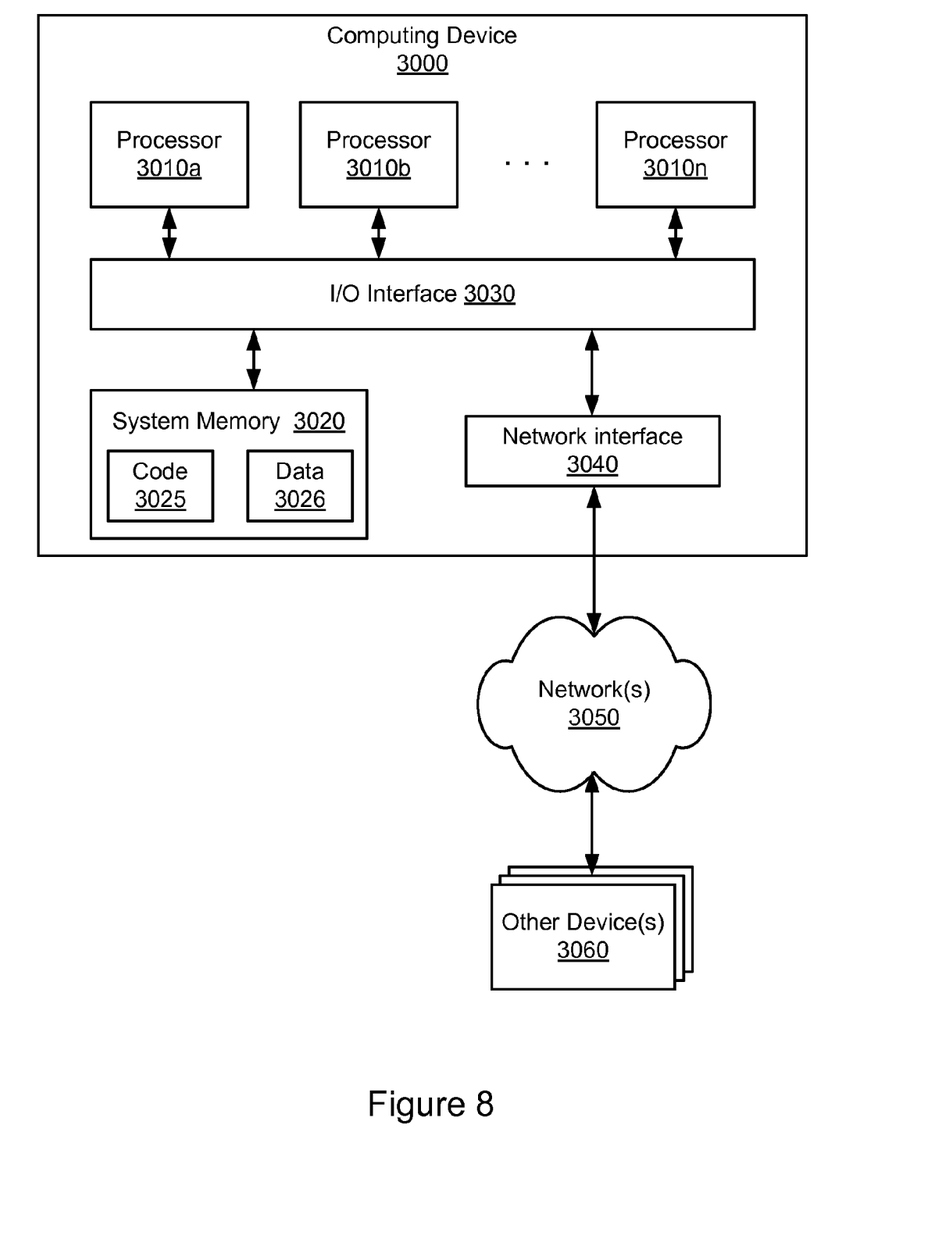
FIG. 8 illustrates an example of a computing device that may be used in some embodiments.

The code execution system 105 may comprise one or more computing devices, any of which may be implemented by the example computing device 3000 illustrated in FIG. 8. In various embodiments, the functionality of the different components and/or modules of the code execution system 105 may be provided by the same computing device or by different computing devices. If any of the components and/or modules are implemented using different computing devices, then the respective computing devices may be communicatively coupled, e.g., via a network.

Figure 2:
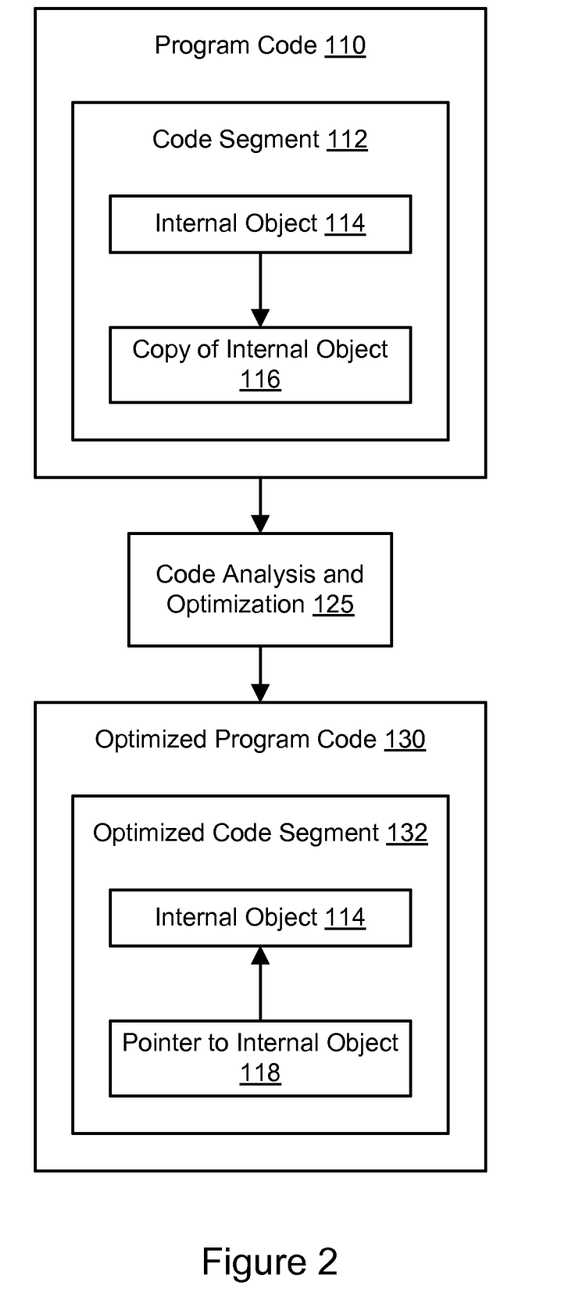
FIG. 2 illustrates further aspects of an example system environment for avoiding data copies through program code analysis, according to one embodiment.

FIG. 2 illustrates further aspects of an example system environment for avoiding data copies through program code analysis, according to one embodiment. In one embodiment, the program code 110 may be optimized to replace a copy of a data object with a pointer to the data object under particular circumstances. A code segment 112 in the program code 110 may be analyzed, e.g., using the code analysis and optimization module 125. The code segment may include a function, procedure, or subroutine that is analyzed using the techniques described herein. In one embodiment, the code segment may include a data builder function that assembles a data object based on one or more elements of input. The builder function may typically use an internal object 114 to build the final result, and the builder function may typically make a copy 116 of the internal object to be returned as its output.

In one embodiment, the output object may be an immutable object. An immutable object may be an object whose state cannot be modified after it is created. Immutable objects may be considered inherently thread-safe and are frequently used as a way to avoid contention on multi-processor systems. To simplify its construction, an immutable object is often built using a series of mutating operations followed by a final construction step that freezes the underlying data. The final step typically requires a data copy to ensure that the data being referenced is truly immutable. In one embodiment, the code analysis and optimization module 125 may search the program code 110 for any operation that would create an immutable object using a copy and, if any are found, determine if any optimizations are possible.

If there are no references to the original object 114 found in the program code 110 outside of the code segment 112 or after the copy operation in the program code 110, the code may be optimized to eliminate the copy. In one embodiment, the optimized program code 130 may include an optimized code segment 132 corresponding to the original code segment 112. In the optimized code segment 132, the copy of the internal object 116 is not made, e.g., to produce the output of a builder function. Instead, the builder function in the optimized code segment 132 may return a pointer 118 to the internal object. In this manner, an unnecessary or redundant copy of an object 114 may be eliminated if the state of the object is never visible outside of the code segment 112.

Any suitable technique may be used to determine whether the code segment 112 includes any references to the internal object 114 outside of a particular function or after the copy 116 is made. In one embodiment, escape analysis may be performed by the code analysis and optimization module 125. As used herein, escape analysis refers to a method for determining the dynamic scope of pointers. Using escape analysis, if a function allocates memory for an object and returns a pointer to the object, then the pointer may be considered to have "escaped" because the object can then be accessed from undetermined places in the program. In escape analysis, pointers may also be considered to escape if they are stored in global variables or other data structures that escape a particular procedure. Therefore, escape analysis may be performed to determine the places where a pointer can be stored and whether the lifetime of the pointer can be proven to be restricted only to the current code segment (e.g., function, procedure, subroutine, etc.).

An example of a code segment 112 to be optimized in this manner is the following:

```
public String toString( ) {
  StringBuilder builder=new StringBuilder( );
  builder.append(field1).append(',').append(field2);
  return builder.toString( );
}
```

In this example code segment, the builder.toString( ) operation allocates a new character array and copies the current character content to it. The copy may be required to make the String immutable in the face of additional operations on the StringBuilder. Using the techniques described herein (e.g., escape analysis), the code analysis and optimization module 125 of a virtual machine 120 may determine that the builder variable may never be accessed after its toString( ) has been called. Accordingly, the code analysis and optimization module 125 may generate an optimized version of the operation that eliminates the operation to copy the builder variable and instead includes an operation to update a pointer of the resulting String variable such that it references the builder's internal character array. In various embodiments, this optimization may be applied to any operation that performs a copy to ensure immutability, including input and output streams or data transformations such as escaping, token replacement, or string formatting.

Figure 3:
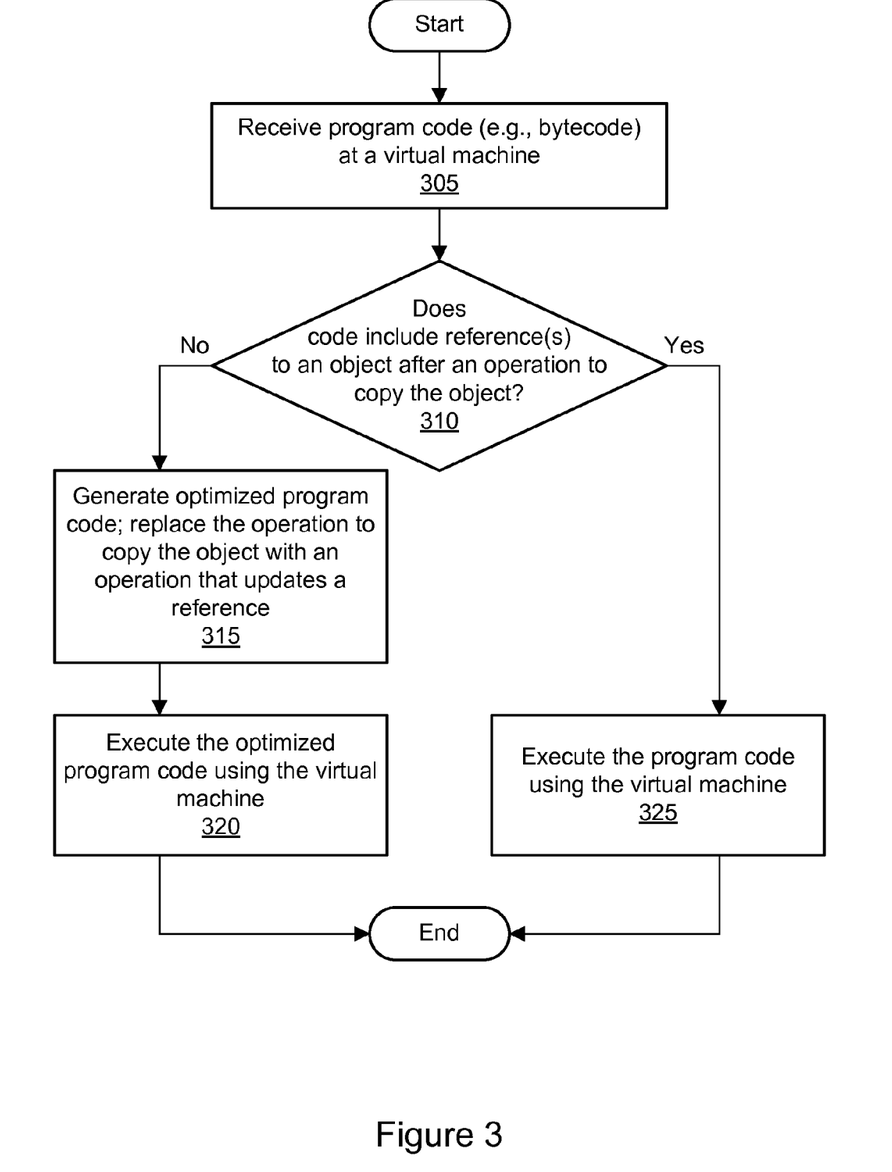
FIG. 3 is a flowchart illustrating a method for avoiding data copies through program code analysis, according to one embodiment.

FIG. 3 is a flowchart illustrating a method for avoiding data copies through program code analysis, according to one embodiment. As shown in 305, a set of program code may be received at a virtual machine. In one embodiment, the program code may be expressed in a high-level programming language that the virtual machine can process using interpretation or just-in-time compilation. In one embodiment, the program code may comprise bytecode that has been compiled for execution using the virtual machine. In one embodiment, the virtual machine may perform aspects of the operations shown in 310-325.

As shown in 310, the program code may be analyzed to determine whether it includes any references to a data object after an operation to generate a copy of the data object is encountered in the code. The operation to generate the copy of the object may be an operation to generate output of a data builder function, and the analysis operation shown in 310 may include determining that a state of the object is not visible within the program code outside of the data builder function. Generally, the operation shown in 310 may determine the equivalence of reassigning a pointer to performing a copy.

If any such references are found in the operation shown in 310, then as shown in 325, the original program code may be left un-optimized and may be executed using the virtual machine. On the other hand, if no such references are found, then as shown in 315, optimized program code may be generated based on the set of program code. In the optimized program code, the operation to make the copy of the object may be replaced with an operation that updates a reference. As shown in 320, the optimized program code may be executed using the virtual machine, e.g., by generating machine code for the underlying physical machine and causing the execution of the machine code on the underlying physical machine.

In one embodiment, the optimized program code may include an operation to truncate or reallocate memory when transferring the pointer. For example, the builder may over-allocate memory to allow for growth while the build is ongoing. If the pointer were simply transferred, then the over-allocation would be persistent but unreachable, thus reducing the memory available to the application. If the memory is instead reallocated or truncated, then the excess memory may be returned to the pool. In one embodiment, the reallocate or truncate operation may be performed by the heap memory manager of an operating system running on the physical machine.

In one embodiment, the analysis operation shown in 310 may include determining the size of the memory that would need to be copied and then, based on the determined size, selecting from a set of choices: performing the copy, moving the pointer and not reallocating the memory, or moving the pointer and reallocating the memory. For sufficiently small objects, it may be possible to perform the copy faster than a reallocation. This additional optimization may be performed through static analysis or through dynamic analysis (e.g., as part of a just-in-time compilation process). In one embodiment, the analysis may use probabilistic techniques or other statistical techniques to predict the size of the memory, e.g., based on the average memory size of types of variables in the application or process.

Copy-on-Write Allocation to Avoid or Defer Buffer Copies

Figure 4:
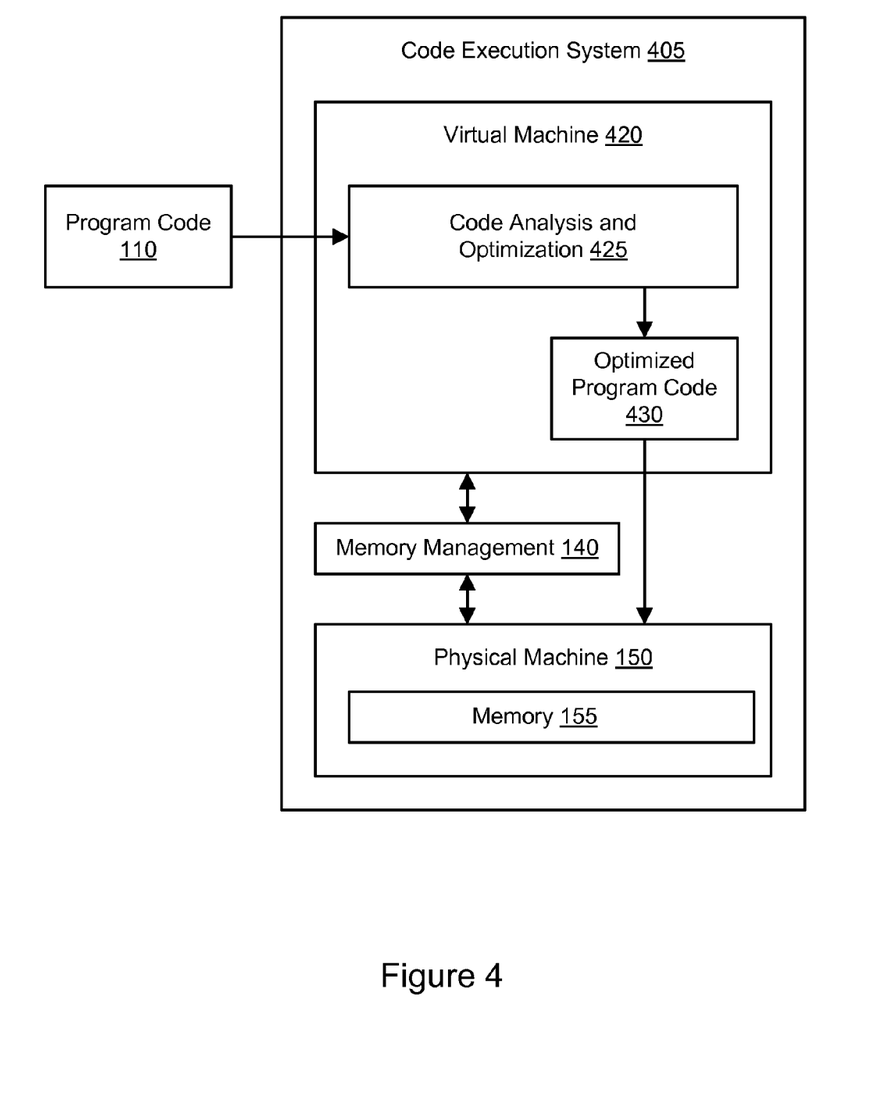
FIG. 4 illustrates an example system environment for deferring data copies through program code analysis, according to one embodiment.

FIG. 4 illustrates an example system environment for deferring data copies through program code analysis, according to one embodiment. In one embodiment, a code execution system 405 may include a virtual machine 420 and a physical machine 150. Using functionality such as an interpreter or just-in-time compiler, the virtual machine may provide a platform for execution of high-level programming language on suitable computing hardware such as the physical machine 150. The virtual machine 420 may take high-level program code written in the high-level programming language and generate executable program code for the underlying physical machine 150. The virtual machine 420 may be implemented using any suitable virtualization technologies. In one embodiment, the program code that runs on the virtual machine 420 may be substantially platform-independent, such that different implementations of the virtual machine 420 may interpret or just-in-time compile the same set of high-level program code for execution on a plurality of types of computing hardware running any of a plurality of underlying operating systems. The virtual machine 420 may also be referred to as a managed runtime system. The virtual machine 420 may be said to run on the physical machine 150. Any example of a suitable physical machine 150 is illustrated in FIG. 8.

In various embodiments, the virtual machine 420 may include various modules, such as a code analysis and optimization module 425. Using the code analysis and optimization module 425, optimized program code 430 may be generated based on program code 110 (e.g., bytecode). For example, the optimized program code 430 may defer copies of data objects found in the program code 110. As will be described in greater detail below, the virtual machine 420 may interact with a memory management subsystem 140 that manages memory 155 of the physical machine 150 in order to perform some optimizations of the program code 110. The memory management subsystem 140 may be provided by an operating system running on the physical machine 150. In one embodiment, the code analysis and optimization module 425 may work in tandem with an interpreter or just-in-time compiler of the virtual machine 420 to analyze and optimize code dynamically, i.e., as the program code 110 is being run. In one embodiment, the code analysis and optimization module 425 may work in a static manner to generate the optimized program code 430 prior to execution of any of the program code 430. The functionality of the code analysis and optimization module 425 is described in greater detail below with respect to FIGS. 5 and 6.

The code execution system 405 may comprise one or more computing devices, any of which may be implemented by the example computing device 3000 illustrated in FIG. 8. In various embodiments, the functionality of the different components and/or modules of the code execution system 405 may be provided by the same computing device or by different computing devices. If any of the components and/or modules are implemented using different computing devices, then the respective computing devices may be communicatively coupled, e.g., via a network.

Figure 5:
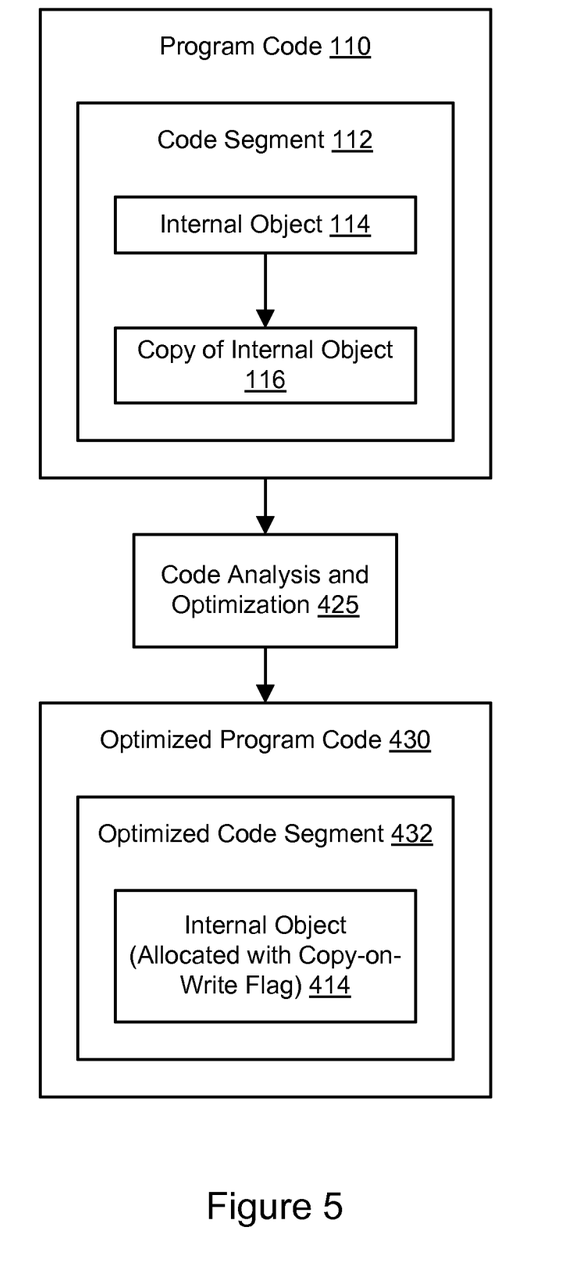
FIG. 5 illustrates further aspects of an example system environment for deferring data copies through program code analysis, according to one embodiment.

FIG. 5 illustrates further aspects of an example system environment for deferring data copies through program code analysis, according to one embodiment. In one embodiment, the program code 110 may be optimized to eliminate or defer a copy of a data object under particular circumstances. A code segment 112 in the program code 110 may be analyzed, e.g., using the code analysis and optimization module 425. The code segment may include a function, procedure, or subroutine that is analyzed using the techniques described herein. In one embodiment, the code segment may include a data builder function that assembles a data object based on one or more elements of input. The builder function may typically use an internal object 114 to build the final result, and the builder function may typically make a copy 116 of the internal object to be returned as its output.

In one embodiment, the internal object 114 may be a buffer. Data may be accumulated in or otherwise added to the buffer using a series of append operations, concatenate operations, or other modification operations. For example, a common pattern in input/output (I/O) subsystems is to accumulate data received from I/O devices on each I/O operation into a buffer before returning an aggregated whole to an application program. For example, a client using HTTP (HyperText Transport Protocol) may receive an entity as multiple "chunks" of data over time before returning an entire HTML (HypeText Markup Language) page or image bitmap to an application. Each time a new "chunk" is aggregated into the larger object, the size of the object may be extended and/or a new copy may be made. Individual "chunks" may represent data that is critical to the processing of the overall message. For example, the HTTP header section may need to be received in its entirety before the message can be dispatched properly to an application. The buffering process may prevent the received data from being passed on immediately, but the data received will typically never be modified. In some cases, multiple buffers may be used to accumulate data. Each one of the multiple buffers may represent a different portion of the data, such as the header and body of an HTML document. To decouple the I/O system from the application object, a copy of the data is often made in the un-optimized program code 110. In one embodiment, the code analysis and optimization module 425 may search the program code 110 for any operation that would make such a copy of a buffer and, if any are found, determine if any optimizations are possible. In some cases, such objects may not be subject to optimization using escape analysis due to their large size, e.g., if the object is allocated across multiple pages of a virtual memory subsystem. Accordingly, a different type of optimization may be performed, as discussed as follows.

If such a copy 116 of the original object 114 found in the program code 110, the code may be optimized to eliminate or defer the copy. In one embodiment, the optimized program code 430 may include an optimized code segment 432 corresponding to the original code segment 112. In the optimized code segment 432, the copy of the internal object 116 is not made, e.g., to produce the output of a builder function or a function that accumulates data in a buffer. The operation to copy the object may be removed from the optimized code segment 432, and the memory for storing the object 414 may be allocated using a copy-on-write flag or other suitable parameter in the optimized code segment 432. In this manner, any copying of the object may be deferred until such time as the memory page is "touched," i.e., when a consumer of the object seeks to modify it.

To perform this optimization, the virtual machine 420 may interact with a memory management subsystem 140 that manages memory 155 of the physical machine 150. The memory management subsystem 140 may be provided by an operating system running on the physical machine 150. The copy-on-write functionality may be provided for management of a virtual memory subsystem. When pages in memory are marked copy-on-write, and when one process seeks to modifies the memory, the operating system's kernel intercepts the operation and copies the memory for the consuming process. In one embodiment, copy-on-write functionality may be implemented by notifying the memory management subsystem that certain pages in the address space of a process are read-only. When data is written to these pages, the memory management subsystem may raise an exception that is handled by the kernel. The kernel may then allocate new space in physical memory and make the page being written correspond to that new location in physical memory. Alternatively, the kernel may suspend processing of the modifying thread until other references to the memory have been released.

An example of a code segment 112 to be optimized in this manner is the following, where a character stream is read and returned as a char sequence:

```
try (Reader r= . . . ) {
  char[ ] buffer=new char[1024];
  int count;
  StringBuilder builder=new StringBuilder( );
  while ((count=r.read(buffer))>0) {
    builder.append(buffer, 0, count);
  }
  return builder.toString( );
}
```

In this example, each time append( ) needs to expand the builder's internal storage, a copy is made of the current state. In addition, the toString( ) operation performs a final copy to truncate that storage and to ensure the mutable state is made visible to other threads. In practice, the character array backing the builder and the resulting String is not visible for modification. If escape analysis cannot definitively determine that no further references to the internal object are made, then the virtual machine may still avoid the data copy for some usages by allocating the array using memory with "copy-on-write" semantics. As a result of this allocation, an attempt to modify the underlying memory will trigger a trap in the underlying memory system that would allow the copy to be made. By deferring the copy in this manner, a copy operation may be avoided for the common situation where the backing array is not modified, but a copy may still be provided if some code path does result in modification of the object.

Figure 6:
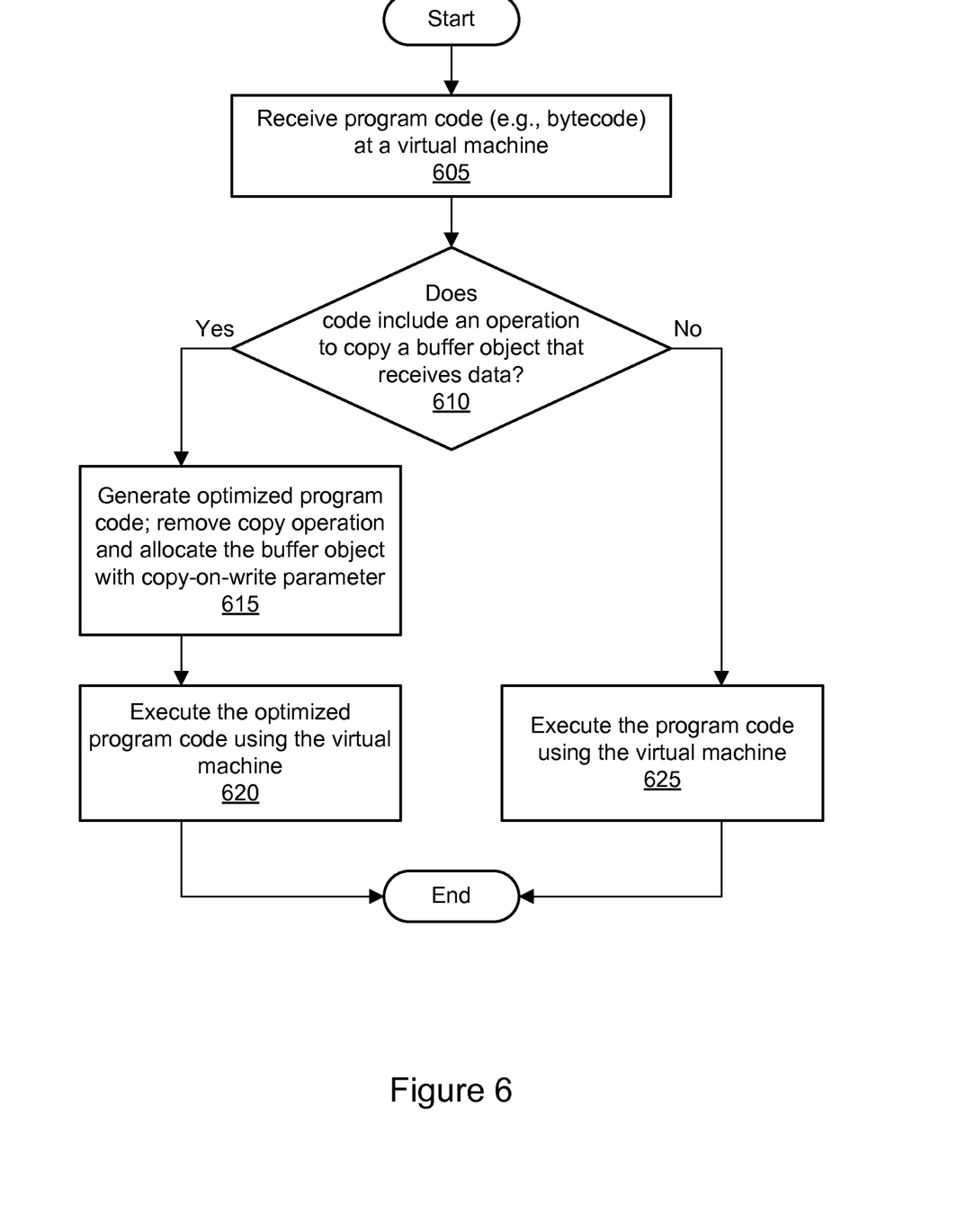
FIG. 6 is a flowchart illustrating a method for deferring data copies through program code analysis, according to one embodiment.

FIG. 6 is a flowchart illustrating a method for deferring data copies through program code analysis, according to one embodiment. As shown in 605, a set of program code may be received at a virtual machine. In one embodiment, the program code may be expressed in a high-level programming language that the virtual machine can process using interpretation or just-in-time compilation. In one embodiment, the program code may comprise bytecode that has been compiled for execution using the virtual machine. In one embodiment, the virtual machine may perform aspects of the operations shown in 610-625.

As shown in 610, the program code may be analyzed to determine whether it includes an operation to generate a copy of an object such as a buffer object. In one embodiment, data may be added to the object at different times, e.g., as a result of one or more input/output operations. Data may be accumulated into the object using a plurality of modification operations such as append or concatenate operations. The operation to generate the copy of the object may be an operation to generate output of a function.

If no such operations are found in the operation shown in 610, then as shown in 625, the original program code may be left un-optimized and may be executed using the virtual machine. On the other hand, if such operations are found, then as shown in 615, optimized program code may be generated based on the set of program code. In the optimized program code, the operation to copy the buffer object may be removed, and the buffer object may be allocated with a copy-on-write flag or other suitable parameter provided by an underlying memory management subsystem.

As shown in 620, the optimized program code may be executed using the virtual machine, e.g., by generating machine code for the underlying physical machine and causing the execution of the machine code on the underlying physical machine. If, during execution of the optimized program code, an element of the code attempts to write to at least one of the memory pages storing the buffer object, then a copy of the "touched" memory page(s) may be generated by the memory management subsystem for modification by the consumer.

Figure 7:
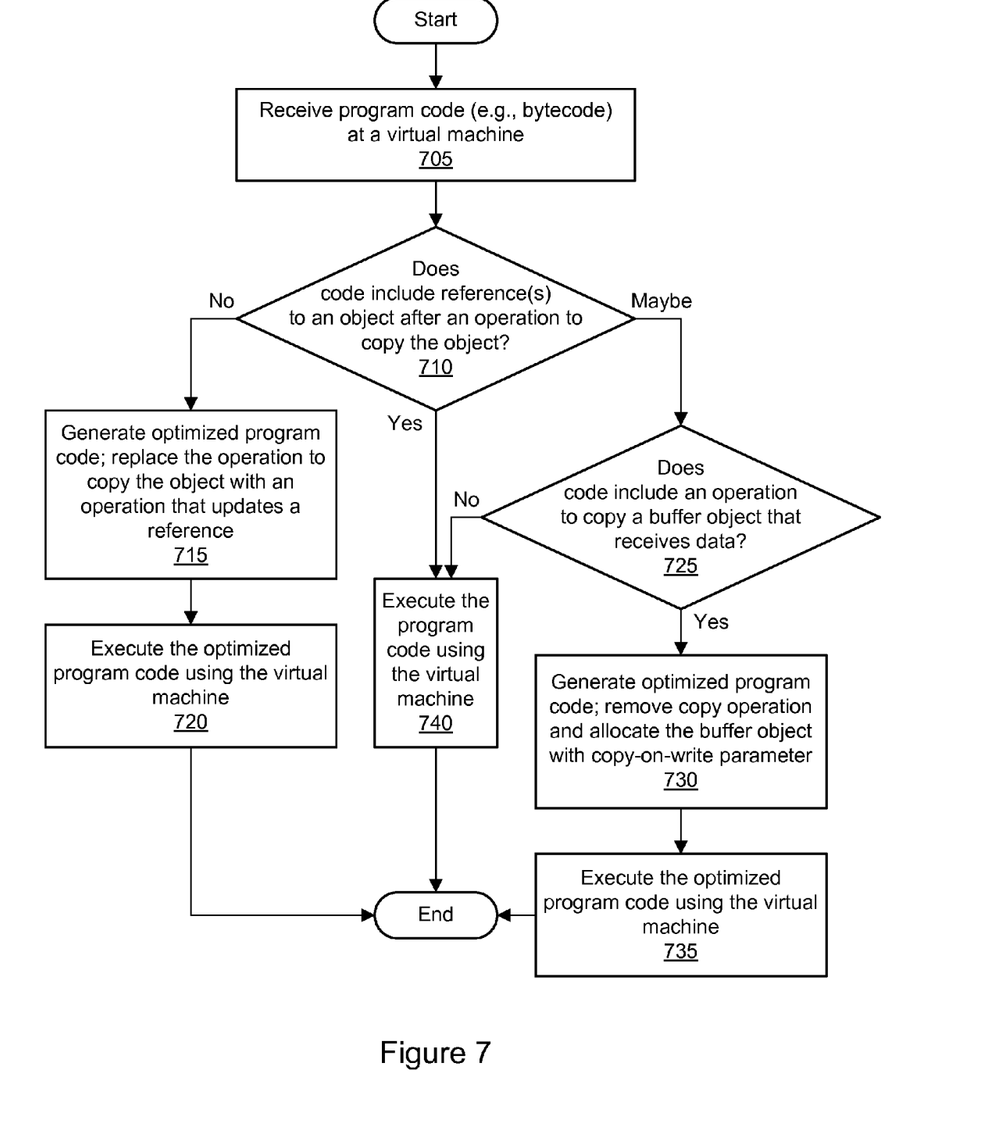
FIG. 7 is a flowchart illustrating a method for avoiding data copies and/or deferring data copies through program code analysis, according to one embodiment.

In one embodiment, both types of optimizations discussed above (e.g., as shown in FIGS. 3 and 6) may be performed together, i.e., on the same set of program code. FIG. 7 is a flowchart illustrating a method for avoiding data copies and/or deferring data copies through program code analysis, according to one embodiment. As shown in 705, a set of program code may be received at a virtual machine. In one embodiment, the program code may be expressed in a high-level programming language that the virtual machine can process using interpretation or just-in-time compilation. In one embodiment, the program code may comprise bytecode that has been compiled for execution using the virtual machine. In one embodiment, the virtual machine may perform aspects of the operations shown in 710-740.

As shown in 710, the program code may be analyzed to determine whether it includes any references to a data object after an operation to generate a copy of the data object is encountered in the code. The operation to generate the copy of the object may be an operation to generate output of a data builder function, and the analysis operation shown in 710 may include determining that a state of the object is not visible within the program code outside of the data builder function.

If any such references are found in the operation shown in 710, then as shown in 740, the original program code may be left un-optimized and may be executed using the virtual machine. On the other hand, if no such references are definitively found, then as shown in 715, optimized program code may be generated based on the set of program code. In the optimized program code, the operation to make the copy of the object may be replaced with an operation that updates a reference. As shown in 720, the optimized program code may be executed using the virtual machine, e.g., by generating machine code for the underlying physical machine and causing the execution of the machine code on the underlying physical machine.

If the absence of references to the object cannot be definitively established in the operation shown in 710, then further analysis may be performed. As shown in 725, the program code may be analyzed to determine whether it includes an operation to generate a copy of an object such as a buffer object. In one embodiment, data may be added to the object at different times, e.g., as a result of one or more input/output operations. Data may be accumulated into the object using a plurality of modification operations such as append or concatenate operations. The operation to generate the copy of the object may be an operation to generate output of a function.

If no such operations are found in the operation shown in 725, then as shown in 740, the original program code may be left un-optimized and may be executed using the virtual machine. On the other hand, if such operations are found, then as shown in 730, optimized program code may be generated based on the set of program code. In the optimized program code, the operation to copy the buffer object may be removed, and the buffer object may be allocated with a copy-on-write flag or other suitable parameter provided by an underlying memory management subsystem.

As shown in 735, the optimized program code may be executed using the virtual machine, e.g., by generating machine code for the underlying physical machine and causing the execution of the machine code on the underlying physical machine. If, during execution of the optimized program code, an element of the code attempts to write to at least one of the memory pages storing the buffer object, then a copy of the "touched" memory page(s) may be generated by the memory management subsystem for modification by the consumer.

Illustrative Computer System

In at least some embodiments, a computer system that implements a portion or all of one or more of the technologies described herein may include a general-purpose computer system that includes or is configured to access one or more computer-readable media. FIG. 8 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 7 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method, comprising:
   using a virtual machine to perform:
      determining whether a set of program code comprises one or more references to a data object after an operation to generate a copy of the data object, wherein the set of program code is executable using the virtual machine;
      if the set of program code does not comprise one or more references to the data object after the operation to generate the copy of the data object, generating a set of optimized program code, comprising replacing the operation to generate the copy of the data object in the set of program code with an operation to update a reference in the set of optimized program code;
      determining whether the set of program code comprises an operation to generate a copy of a buffer object; and
      if the set of program code comprises the operation to generate the copy of the buffer object, generating a set of further optimized program code, wherein the set of further optimized program code comprises an allocation of one or more memory pages to store the buffer object with a copy-on-write parameter instead of the operation to generate the copy of the buffer object.

2. The method as recited in claim 1, wherein the operation to update the reference comprises an operation to make an output object of a function reference the data object, wherein the data object is built by the function.

3. The method as recited in claim 1, wherein the copy of the data object comprises an immutable object.

4. The method as recited in claim 1, further comprising:
   executing the set of further optimized program code using the virtual machine, comprising:
      attempting to write to at least one of the memory pages storing the buffer object; and
      in response to the attempting to write, causing a copy of the at least one memory page to be generated.

5. A non-transitory, computer-readable storage medium storing program instructions computer-executable to perform:
   determining whether a set of program code comprises one or more references to a data object after an operation to generate a copy of the data object, wherein the set of program code is executable using a virtual machine;
   if the set of program code does not comprise one or more references to the data object after the operation to generate the copy of the data object, generating a set of optimized program code, comprising replacing the operation to generate the copy of the data object in the set of program code with an operation to update a reference in the set of optimized program code;
   determining whether the set of program code comprises an operation to generate a copy of a buffer object; and
   if the set of program code comprises the operation to generate the copy of the buffer object, generating a set of further optimized program code, wherein the set of further optimized program code comprises an allocation of one or more memory pages to store the buffer object with a copy-on-write parameter instead of the operation to generate the copy of the buffer object.

6. The non-transitory, computer-readable storage medium as recited in claim 5, wherein the operation to update the reference comprises an operation to make an output object of a function reference the data object, wherein the data object is built by the function.

7. The non-transitory, computer-readable storage medium as recited in claim 5, wherein the copy of the data object comprises an immutable object.

8. The non-transitory, computer-readable storage medium as recited in claim 5, wherein the program instructions are further computer-executable to perform:
    executing the set of further optimized program code using the virtual machine, comprising:
        attempting to write to at least one of the memory pages storing the buffer object; and
        in response to the attempting to write, causing a copy of the at least one memory page to be generated.

9. The non-transitory, computer-readable storage medium as recited in claim 5, wherein the set of optimized program code comprises a truncation or reallocation of memory storing the object.

10. A computer system, comprising:
    one or more hardware computing devices comprising one or more processors; and
    a virtual machine implemented by the one or more hardware computing devices,
        wherein the virtual machine is configured to:
            determining whether a set of program code comprises one or more references to a data object after an operation to generate a copy of the data object, wherein the set of program code is executable using the virtual machine;
            if the set of program code does not comprise one or more references to the data object after the operation to generate the copy of the data object, generating a set of optimized program code, comprising replacing the operation to generate the copy of the data object in the set of program code with an operation to update a reference in the set of optimized program code;
            determining whether the set of program code comprises an operation to generate a copy of a buffer object; and
            if the set of program code comprises the operation to generate the copy of the buffer object, generating a set of further optimized program code, wherein the set of further optimized program code comprises an allocation of one or more memory pages to store the buffer object with a copy-on-write parameter instead of the operation to generate the copy of the buffer object.

11. The computer system as recited in claim 10, wherein the operation to update the reference comprises an operation to make an output object of a function reference the data object, wherein the data object is built by the function.

12. The computer system as recited in claim 10, wherein the copy of the data object comprises an immutable object.

13. The computer system as recited in claim 10, wherein the virtual machine is further configured to perform:
    executing the set of further optimized program code using the virtual machine, comprising:
        attempting to write to at least one of the memory pages storing the buffer object; and
        in response to the attempting to write, causing a copy of the at least one memory page to be generated.

14. The computer system as recited in claim 10, wherein the set of optimized program code comprises a truncation or reallocation of memory storing the object.

* * * * *